Jan. 26, 1954

C. J. GARDNER 2,667,372

AUTOMOBILE TAIL PIPE CONNECTOR

Filed Oct. 25, 1950

Inventor
Charles J. Gardner
By
Bean, Brooks, Buckley & Bean
Attorneys

Patented Jan. 26, 1954

2,667,372

UNITED STATES PATENT OFFICE 2,667,372

AUTOMOBILE TAIL PIPE CONNECTOR

Charles J. Gardner, Bradford, Pa.

Application October 25, 1950, Serial No. 192,102

6 Claims. (Cl. 285—198)

This invention relates to gas conveying devices for use in automobile repair shops and the like, and more particularly to improved means for detachably connecting gas conveying conduits to automobile muffler tail pipes which are equipped with variously shaped and dimensioned gas deflector accessories.

One of the objects of the invention is to provide an improved quick connection device for coupling gas conveying conduits to automobile tail pipes in substantially gas-tight manner so that the automobile engine may thereupon be run for inspection or servicing thereof while the exhaust gases are conveyed through the connected conduit to the atmosphere externally of the repair shop.

Another object of the invention is to provide a coupling device as aforesaid which is adapted to quick and easy application to automobile tail pipes having mounted thereon variously shaped and dimensioned gas deflector devices such as are presently popular with automobile users.

Other objects and advantages of the invention will appear from the specification hereinafter.

Whereas, it is well known that in automobile repair shops it is highly desirable to convey engine exhaust gases from a running automobile engine to the atmosphere externally of the shop, flexible metal hoses and other conduit systems have been successfully employed for such purposes when they may be slip-fitted upon the conventional small diameter tail pipe of an automobile muffler system. However, it is a presently popular practice by many automobile users to mount variously shaped and dimensioned gas deflector accessories on the extending ends of such tail pipes, and the presence of such deflectors renders it impracticable to slip-fit a conduit thereover and/or to obtain a substantially gas-tight connection therewith. Thus, it has heretofore been necessary for the automobile mechanic to either tediously detach the deflector accessory or to obtain a sufficiently large conduit to slip over the deflector and then to arrange some make-shift device for gas-sealing the relatively large conduit to the relatively small tail pipe ahead of the deflector device. Such make-shift arrangements have been most unsatisfactory and/or dangerous in use.

In the drawing, an exemplification of the invention is illustrated, wherein.

Figure 1:
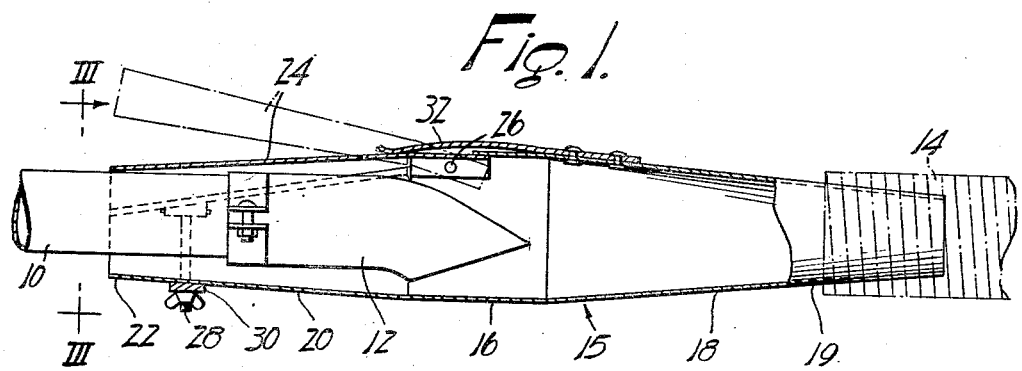
Fig. 1 is a fragmentary vertical longitudinal section through a connection device of the invention which is shown in position on an automobile tail pipe.
Figure 2:
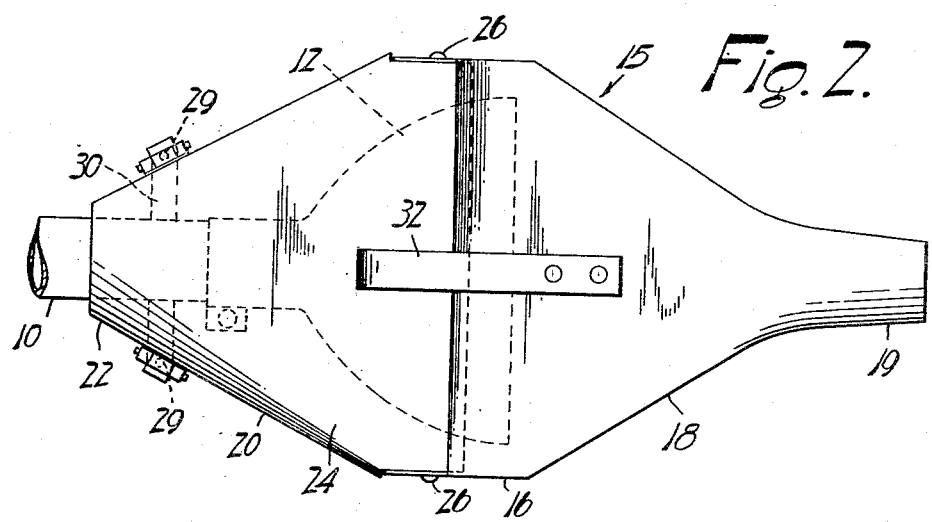
Fig. 2 is a top plan view thereof.
Figure 3:
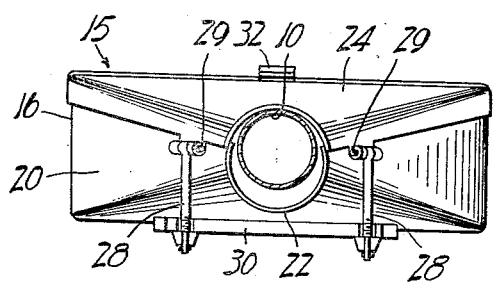
Fig. 3 is an end view thereof as taken along lines III—III of Fig. 1.

In the drawing, the automobile muffler tail pipe is designated 10 and is shown as being fitted with a gas deflector accessory 12 which in side view is turned downwardly at its discharge end while fanning outwardly in plan view, as is generally typical of such accessory devices. Whereas, only one specific form of gas deflector accessory is illustrated in the drawing it will of course be understood that manufacturers presently supply a large variety of such devices which are variously shaped and dimensioned, but which typically turn downwardly as shown in Fig. 1 and fan laterally as shown in Fig. 2. Thus, such deflector accessory devices prohibit the simple slip-fitting of the customary gas conveying conduit as indicated at 14 (Fig. 1) directly onto the tail pipe 10 unless the conduit 14 were to be provided of sufficient diameter to slide over the plan view form of the deflector 12, or unless the deflector 12 were first removed from the tail pipe 10.

The present invention contemplates a connection device which is indicated in the drawing generally at 15 and which is formed of sheet metal or the like to comprise a hollow box-like central body portion 16 which is of generally rectangularly sectioned form and of suitable dimensions to accommodate therein the flared end portion of the gas deflector 12. The casing tapers in one direction from the mid-portion 16 thereof as indicated at 18 to increasingly reduced sectional form and then merges into a tubular nipple portion 19 which is of circular sectional form and so dimensioned as to conveniently slip-fit into one end of a conventional conduit 14 for conveying the engine exhaust gas to the atmosphere externally of the repair shop. At its other end the casing 16 also tapers as indicated at 20 to a reduced throat end portion 22 which is circularly sectioned and dimensioned so as to substantially complement the outer diameter of the automobile tail pipes to be encountered from day to day in connection with car repair services.

The top of the reducing section 20 is cut away and replaced by a sheet metal lid 24 which is hinged to the casing 16 as indicated at 26—26. Hold down bolts 28 may be hinged to the lid 24 as indicated at 29 for cooperation with an apertured bracket 30 fixed to the bottom of the casing to hold the lid in closed position. Or, as indicated at 32, a spring device may be used so as to always bias the lid toward closed position. Thus, it is only necessary for the user to pull open the lid for application to the automobile tail pipe and then upon release of the lid it snaps into closed position. Thus, it will be appreciated that with the lid 24 in open position the coupling device 15 may be brought up from under the deflector 12 so as to enclose the latter whereupon the lid 24 may then be clamped down in closed position as shown in the drawing. Thus, the reduced neck portion 22 of the device closely complements the tail pipe 10 while the nipple portion 19 readily slip-fits into the carry-off conduit 14; and with minimum difficulty the mechanic is thereby enabled to effect a substantially gas-tight seal between the tail pipe and the conduit 14 regardless of the particular size and shape of the deflector 12. Thus, the coupling device 15 is readily attached to and detached from automobile tail pipes for the purposes explained, and is practically universally applicable to any size and type deflector device to be met in use.

Although only one form of the invention has been shown and described in detail, it will be apparent to those skilled in the art that the invention is not so limited but that various changes may be made therein without departing from the spirit of the invention or the scope of the appended claims.

I claim:

1. An automobile tail pipe connection device for coupling an automobile tail pipe to a conduit for conveying the automobile engine exhaust gases remotely therefrom, said device comprising a box-like casing having a sectionally enlarged mid-section and tapering therefrom in one direction into a reduced diameter circularly sectioned nipple portion adapted to slip-fit into a conduit for conveying away the exhaust gases, said casing tapering away in the other direction from said mid-section into a sectionally reduced throat portion adapted to fit about the outer diameter of the automobile tail pipe, said second tapering casing portion being cut away at the top thereof, a lid adapted to cover said cut away casing portion hingedly connected to said casing so that when the lid is pivoted into open position said casing is opened to receive therein the end of an automobile tail pipe and a dimensionally expanded gas deflector accessory mounted thereon, and whereby upon closure of said lid said casing thereupon completely encloses said deflector accessory to receive therefrom engine exhaust gases for conveyance to said conduit, and means for retaining said lid in closed position.

2. An automobile tail pipe connection device for coupling an automobile tail pipe to a conduit for conveying the automobile engine exhaust gases remotely therefrom, said device comprising a box-like casing having at one end a reduced diameter circularly sectioned nipple portion adapted to slip-fit into a conduit for conveying away the exhaust gases, said casing having at its other end a sectionally reduced throat portion adapted to fit about the outer diameter of the automobile tail pipe, said casing being cut away at a wall thereof and equipped with a lid for covering said cut away wall, said lid being hinged to said casing for movement between an open position wherein said casing is opened to receive therein a dimensionally expanded tail pipe gas deflector accessory and a closed position wherein said casing completely encloses the ends of said deflector and tail pipe to receive therefrom engine exhaust gases for conveyance to said conduit, and means for releasably maintaining said lid in closed position.

3. An automobile tail pipe connection device for coupling an automobile tail pipe to a conduit for conveying the automobile engine exhaust gases remotely therefrom, said device comprising a box-like casing having a reduced diameter gas outlet portion adapted for slip-fitting connection with a conduit for conveying away the exhaust gases, said casing also having a throat portion adapted to fit about the automobile tail pipe, said casing in the region of said throat portion being cut away at a wall portion thereof to receive therein a relatively large gas deflector device mounted as an accessory on the engine tail pipe, said casing being equipped with a lid adapted to cover said cut away wall portion and hinged to said casing for movement to an open position wherein said casing is opened to receive therein said relatively large gas deflector device and to a closed position wherein said casing is thereupon arranged to completely enclose said deflector to receive therefrom engine exhaust gases for conveyance to said conduit, and means for releasably retaining said lid in closed position.

4. An automobile tail pipe connection device for coupling an automobile tail pipe to a conduit for conveying the automobile engine exhaust gases remotely therefrom, said device comprising a casing having a reduced diameter gas outlet nipple portion extending therefrom and adapted to slip-fit into such a conduit for conveying away the exhaust gases and a throat portion adapted to fit about the automobile tail pipe, said casing being cut away at a wall thereof for receiving therein a relatively large gas deflector mounted on the tail pipe, and a lid hingedly connected to said casing for movement about an axis transverse to the tail pipe into an open position wherein said casing is opened to receive therein said gas deflector and a closed position wherein said casing completely encloses said deflector to receive therefrom engine exhaust gases for conveyance to said conduit, and manually operable means for releasably retaining said lid in closed position.

5. An automobile tail pipe connection device for coupling an automobile tail pipe to a conduit for conveying the automobile engine exhaust gases remotely therefrom, said device comprising a box-like casing having at one end a reduced diameter circularly sectioned nipple portion adapted to slip-fit into a conduit for conveying away the exhaust gases, said casing having at its other end a sectionally reduced throat portion adapted to fit about the outer diameter of the automobile tail pipe, said casing being cut away at a wall thereof and equipped with a lid hinged thereto so that when the lid is hinged into open position said casing is opened to receive therein a dimensionally expanded tail pipe gas deflector accessory extending from said tail pipe, and spring means biasing said lid toward closed position so as to cause said device to completely enclose the ends of said deflector and tail pipe devices to receive therefrom engine exhaust gases for conveyance to said conduit.

6. An automobile tail pipe connection device for coupling an automobile tail pipe to a conduit for conveying the automobile engine exhaust gases remotely therefrom, said device comprising a box-like casing having a reduced size gas outlet portion adapted to slip-fit into a conduit for conveying away the exhaust gases, said casing also having a reduced throat portion adapted to fit about the automobile tail pipe, said casing in the region of said throat portion being cut away at a wall portion thereof and equipped with a lid hinged thereto so that when the lid is hinged into open position said casing is opened to receive therein a relatively large gas deflector device mounted as an accessory on the engine tail pipe, and spring means biasing said lid toward closed position.

CHARLES J. GARDNER.

References Cited in the file of this patent

UNITED STATES PATENTS

| Number | Name | Date |
| --- | --- | --- |
| 1,448,646 | Ward | Mar. 13, 1923 |
| 2,440,864 | Liss | May 4, 1948 |
| 2,522,630 | McCulloch | Sept. 19, 1950 |